(12) United States Patent
Teng (10) Patent No.: US 8,620,294 B2
(45) Date of Patent: Dec. 31, 2013

(54) MOBILE DEVICE DYNAMIC BACKGROUND

(75) Inventor: Stephanie E. Teng, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 685 days.

(21) Appl. No.: 12/238,014

(22) Filed: Sep. 25, 2008

(65) Prior Publication Data
US 2010/0075649 A1 Mar. 25, 2010

(51) Int. Cl.
*H04M 3/00* (2006.01)
*H04M 1/00* (2006.01)
*G06F 3/038* (2013.01)

(52) U.S. Cl.
USPC ............................ 455/418; 455/566; 345/204

(58) Field of Classification Search
USPC .......................................................... 455/418
See application file for complete search history.

(56) References Cited

U.S. PATENT DOCUMENTS

| | | | |
|---|---|---|---|
| 2004/0085351 A1* | 5/2004 | Tokkonen | 345/741 |
| 2006/0229097 A1* | 10/2006 | Flynt et al. | 455/551 |
| 2007/0018957 A1 | 1/2007 | Seo | |
| 2007/0183381 A1 | 8/2007 | Seo et al. | |
| 2007/0216810 A1 | 9/2007 | Min et al. | |
| 2007/0296738 A1 | 12/2007 | Louch et al. | |
| 2008/0057941 A1* | 3/2008 | Scott et al. | 455/425 |
| 2008/0106531 A1* | 5/2008 | Hullot | 345/204 |
| 2008/0119133 A1 | 5/2008 | Rao | |
| 2008/0134063 A1 | 6/2008 | Volach | |
| 2008/0174427 A1* | 7/2008 | Banerjee et al. | 340/541 |
| 2010/0016003 A1* | 1/2010 | Shapiro et al. | 455/466 |

OTHER PUBLICATIONS

"Magic Wallpaper 5.2.2", Retrieved at <<http://www.filedudes.com/Magic_Wallpaper-download-17232.html>>, Jul. 16, 2008, pp. 3.
"Cell Phone Wallpaper Maker 2.0 B34", Retrieved at <<http://www.filedudes.com/Cell_Phone_Wallpaper_Maker-download-44633.html>>, Jul. 16, 2008, pp. 2.
Lorne, Simon "Samsung SGH-G600 Mobile Phone", Retrieved at <<http://www.reghardware.co.uk/2007/09/27/review_samsung_sgh_g600/>>, Sep. 27, 2007, pp. 6.
"Dynamic & Interactive Image Delivery to Web, to Mobile, to Print", Retrieved at <<http://www.iseemedia.com/zoom/systemrequirements.html>>, Jul. 16, 2008, pp. 2.
"Wallpaper Mate 1.07", Retrieved at <<http://www.itlocation.com/en/software/prd60391,.htm>>, Jun. 14, 2005, pp. 2.

* cited by examiner

*Primary Examiner* — Olumide T Ajibade Akonai
*Assistant Examiner* — Natasha Cosme
(74) *Attorney, Agent, or Firm* — Wofe-SBMC (57) ABSTRACT

A mobile device dynamic background is described. In embodiment(s), a mobile device includes selectable controls via which a selectable input can be received to initiate activation of an operational state of the mobile device. A background image that corresponds to the operational state of the mobile device can be determined, and a current display on the mobile device can be changed to display the background image that is determined to correspond to the operational state when the selectable input is received.

20 Claims, 5 Drawing Sheets

MOBILE DEVICE DYNAMIC BACKGROUND

BACKGROUND

Mobile phones and other portable devices are common in our society and are increasingly used for not only communication, but to store different types of information and data, such as phone numbers, personal information, business information, documents, pictures, and other types of data. A user of a mobile phone can typically select one of the pictures for display as a static background image when the display on the device is activated, such as when the user turns the phone on or when receiving an incoming phone call. Mobile phones and other communication-enabled portable devices typically have connectivity to a voice network for voice communications, and may also be connected to a data network for Internet access and data communication.

SUMMARY

This summary is provided to introduce simplified concepts of a mobile device dynamic background. The simplified concepts are further described below in the Detailed Description. This summary is not intended to identify essential features of the claimed subject matter, nor is it intended for use in determining the scope of the claimed subject matter.

A mobile device dynamic background is described. In embodiment(s), a mobile device includes selectable controls via which a selectable input can be received to initiate activation of an operational state of the mobile device. A background image that corresponds to the operational state of the mobile device can be determined, and a current display on the mobile device can be changed to display the background image that is determined to correspond to the operational state when the selectable input is received.

In other embodiment(s) of a mobile device dynamic background, a selectable input can be received as an operational state to turn the mobile device on, unlock functions of the mobile device, and/or activate a display screen of the mobile device, and the background image can be changed to display as a home screen image. Alternatively, a selectable input can be received as an operational state to lock the functions of the mobile device, and the background image can be changed to display as a lock screen image. In various embodiment(s), the background image can be a synched image that is maintained on a computer system that is synched with the mobile device. The synched image can be communicated from the computer system to a networked service that then communicates the synched image to the mobile device. The background image may also be a filtered image that is identified as including an image of a user of the mobile device, and the filtered image can be communicated from the networked service to the mobile device.

In other embodiment(s) of a mobile device dynamic background, a selectable input can be received to initiate activation of an application that is executed on the mobile device. A background image that corresponds to the application can be determined, and a current display on the mobile device can be changed to display the background image that is determined to correspond to the application. In an embodiment, a selectable input can be received to initiate a calendar, and the background image can be determined and displayed as a photographic image of a contact that is included in an appointment on the calendar. In another embodiment, a selectable input can be received to initiate email, and the background image can be determined and displayed as a photographic image of a contact from which an email has been received. In another embodiment, selected favorite photos or photos generated with a camera of the mobile device can be randomly or serially rotated to display a different background image with each screen illumination or unlock sequence of the mobile device.

BRIEF DESCRIPTION OF THE DRAWINGS

Embodiments of a mobile device dynamic background are described with reference to the following drawings. The same numbers are used throughout the drawings to reference like features and components.

DETAILED DESCRIPTION

Embodiments of a mobile device dynamic background provide that the background image displayed on a mobile device changes when a user-selectable input is received to activate an operational state of the mobile device. For example, a user might turn the mobile device on to check the time, unlock functions of the mobile device, and/or activate the display screen of the mobile device, and the background image can be changed to display as a home screen image. Similarly, a user-selectable input may be received to lock the functions of the mobile device, and the background image can be changed to display as a lock screen image. The background image displayed on the mobile device can also be changed when a user-selectable input is received to activate an application on the mobile device, such as a calendar, email, and/or personal information application. For example, a photographic image of a person that is listed as a contact in the mobile device can be displayed as the background image when the contact is included in an appointment on the calendar, or when an email has been received from the particular person. Additionally, the background image can be randomly rotated images that change with each screen illumination, unlock sequence of the mobile device, and/or or for a number of other reasons, such as when a user checks device status or initiates a device unlock feature.

While features and concepts of the described systems and methods for a mobile device dynamic background can be implemented in any number of different environments, systems, and/or various configurations, embodiments of a mobile device dynamic background are described in the context of the following example systems and environments.

Figure 1:
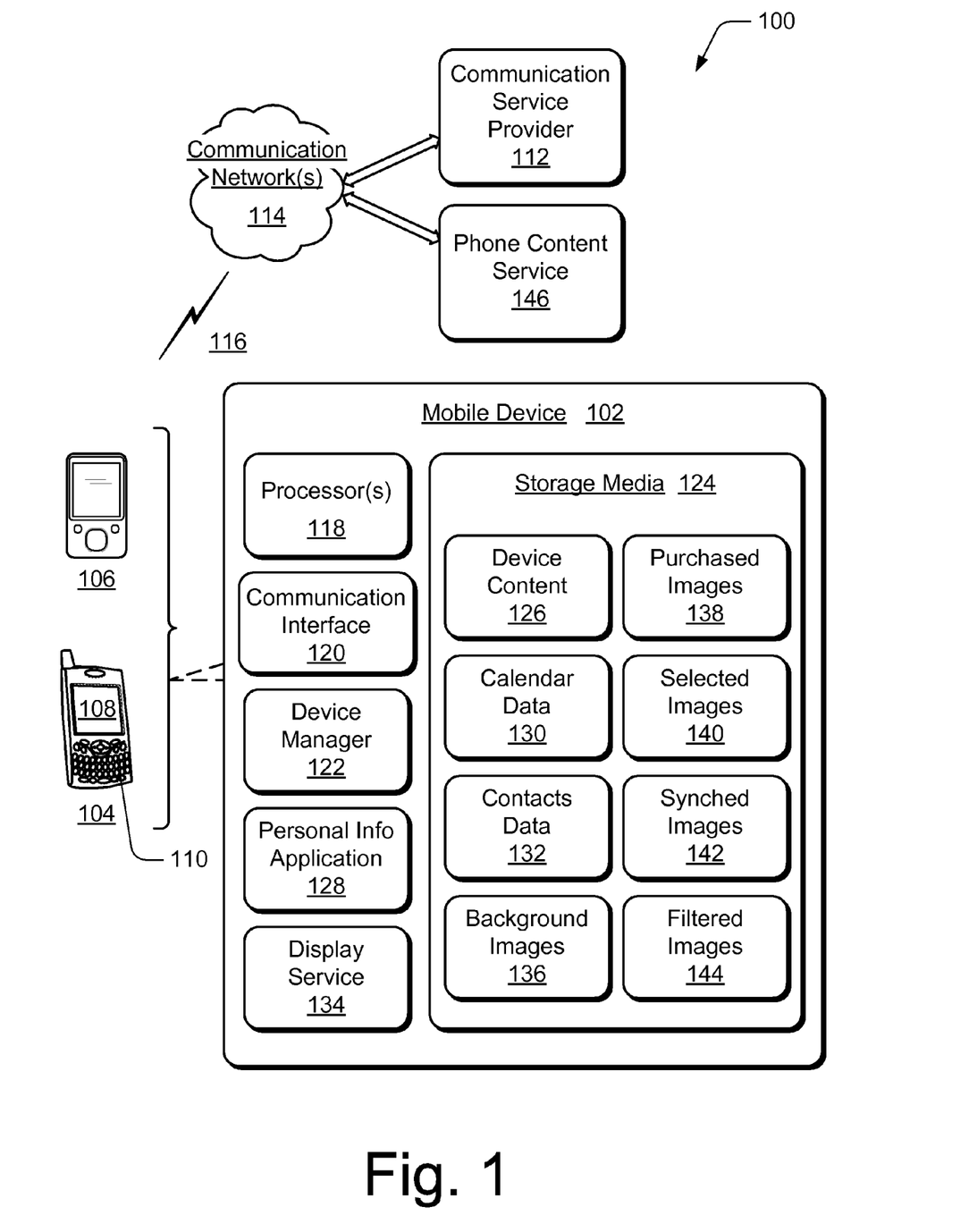
FIG. 1 illustrates an example system in which embodiments of a mobile device dynamic background can be implemented.

FIG. 1 illustrates an example system 100 in which various embodiments of a mobile device dynamic background can be implemented. Example system 100 includes a mobile device 102 that is implemented for data and/or voice communications, such as a mobile phone 104 (e.g., cellular, VoIP, WiFi, etc.), a portable media device 106 (e.g., a personal media player, portable media player, etc.), and/or any other mobile device that can receive data in any form of audio, video, and/or image data. Each of the various mobile devices include an integrated display 108 and selectable input controls 110 via which a user can control the device with selectable inputs.

Example system 100 includes a communication service provider 112 that provides for mobile data and/or voice communications. For example, the communication service provider 112 may be a cell-phone service provider, an Internet service provider, and/or a combination thereof. The communication service provider 112 enables data and/or voice communications for any type of a mobile device 102 (e.g., via cellular, VoIP, WiFi, etc.), and/or any other wireless media or communication device that can receive data, voice, or media content in any form of audio, video, and/or image data.

The mobile device 102 and communication service provider 112 are implemented for communication via communication network(s) 114 that can include any type of a data network, voice network, broadcast network, an IP-based network, and/or a wireless network 116 that facilitates data and/or voice communications. The communication network(s) 114 can be implemented using any type of network topology and/or communication protocol, and can be represented or otherwise implemented as a combination of two or more networks. Any one or more of the arrowed communication links facilitate two-way data communication, such as from the mobile device 102 to the communication service provider 112 and vice-versa.

In this example, mobile device 102 includes one or more processors 118 (e.g., any of microprocessors, controllers, and the like), a communication interface 120 to receive and/or communicate data and voice communications, and a device manager 122 (e.g., a control application, software application, signal processing and control module, etc.). The mobile device 102 can also be implemented with any number and combination of differing components as further described with reference to the example device shown in FIG. 5. A mobile device may also be associated with a user or owner (i.e., a person) and/or an entity that operates the device such that a mobile device describes logical devices that include users, software, and/or a combination of devices.

The mobile device 102 includes storage media 124 to store or otherwise maintain various data, information, and media content. The storage media 124 can be implemented as any type of memory, random access memory (RAM), a nonvolatile memory such as flash memory, read only memory (ROM), a removable storage device, and/or other suitable electronic data storage. The storage media 124 can maintain device content 126, such as configuration settings of the device, media content stored on the device, information associated with a user of the device (e.g., user profile data), business or personal information, documents, and/or messaging content that has been received and/or communicated via the device. Media content stored on the mobile device 102 can include any type of data and audio, video, and/or image media content.

In this example, mobile device 102 includes a personal information application 128 that is a multi-functional application implemented to manage information for a calendar (e.g., calendar data 130), contacts (e.g., contacts data 132), email, tasks, notes, and the like. The mobile device 102 also includes a display service 134 that can be implemented as computer-executable instructions and executed by the processors 118 to implement various embodiments and/or features of a mobile device dynamic background. In various embodiments, the display service 134 can be implemented as several components or modules distributed to implement the embodiments described herein. In addition, a display service can be implemented with any number and combination of differing components as further described with reference to the example service shown in FIG. 4.

In an embodiment, a user may initiate a selectable input with a selectable input control 110 on a mobile device 102 to activate an operational state of the mobile device. The display service 134 can then determine a background image 136 that corresponds to the operational state of the device. The display service 134 can also initiate a change of a current display on the mobile device to display the background image 136 that corresponds to the operational state of the device when the selectable input is received.

For example, a user of the mobile device 102 may initiate a selectable input to turn the mobile device on, unlock functions of the mobile device, activate the display 108 of the mobile device, and/or initiate any other operational state of the device. The display service 134 can determine and display a home screen image as the background image 136 that corresponds to the operational state of the mobile device. Similarly, the user of the mobile device 102 may initiate a selectable input to lock the functions of the device, and the display service 134 can determine and display a lock screen image as the background image 136 that corresponds to the operational state of the device.

In various embodiments, a background image 136 displayed on the mobile device 102 can include photographic images, such as a photograph of a person (e.g., contacts data 132), purchased images 138 (e.g., purchased from an on-line photo service, or other professional photos), selected images 140 (e.g., user-selected, device selected, and/or third-party selected images), synched images 142, filtered images 144, and/or any other types of images that can be displayed as a background image on the display 108 of a mobile device 102. The various background images 136 can be maintained local on the mobile device 102 with storage media 124 and/or stored on a synched computer device or at a networked service, such as phone content service 146. Examples of a synched computer device and the phone content service are each described with reference to FIG. 2.

In an embodiment, the mobile device 102 can receive a synched image 142 that is maintained on a computer system which is synched with the mobile device. The synched image 142 can be communicated from the computer system to the phone content service 146 which then communicates the synched image to the mobile device 102, such as via the communication network(s) 114 and/or the wireless network 116. In another embodiment, the mobile device 102 can receive a filtered image 144 from the phone content service 146. A filtered image 144 can be identified or tagged at the phone content service 146 as including an image of the user of the mobile device 102, such as photos that are viewable on a social networking site.

In another embodiment, the user may initiate a selectable input with a selectable input control 110 on a mobile device 102 to activate an application that is executed on the mobile device. The display service 134 can then determine a background image 136 that corresponds to the application, and also initiate a change of a current display on the mobile device to display the background image 136 that corresponds to the application.

For example, a user of the mobile device 102 may initiate a selectable input to activate a calendar (e.g., a component of the personal information application 128) that is executed by the processor(s) 118 on the mobile device. The display service 134 can determine and display a background image 136 as a photographic image of a person that is listed as a contact (e.g., from the contacts data 132) that is included in an appointment on the calendar. Similarly, the user of the mobile device 102 may initiate a selectable input to activate email (e.g., another component of the personal information application 128) that is executed by the processor(s) 118 on the mobile device. The display service 134 can determine and display a background image 136 as a photographic image of a person that is listed as a contact (e.g., from the contacts data 132) from which an email has been received.

Figure 2:
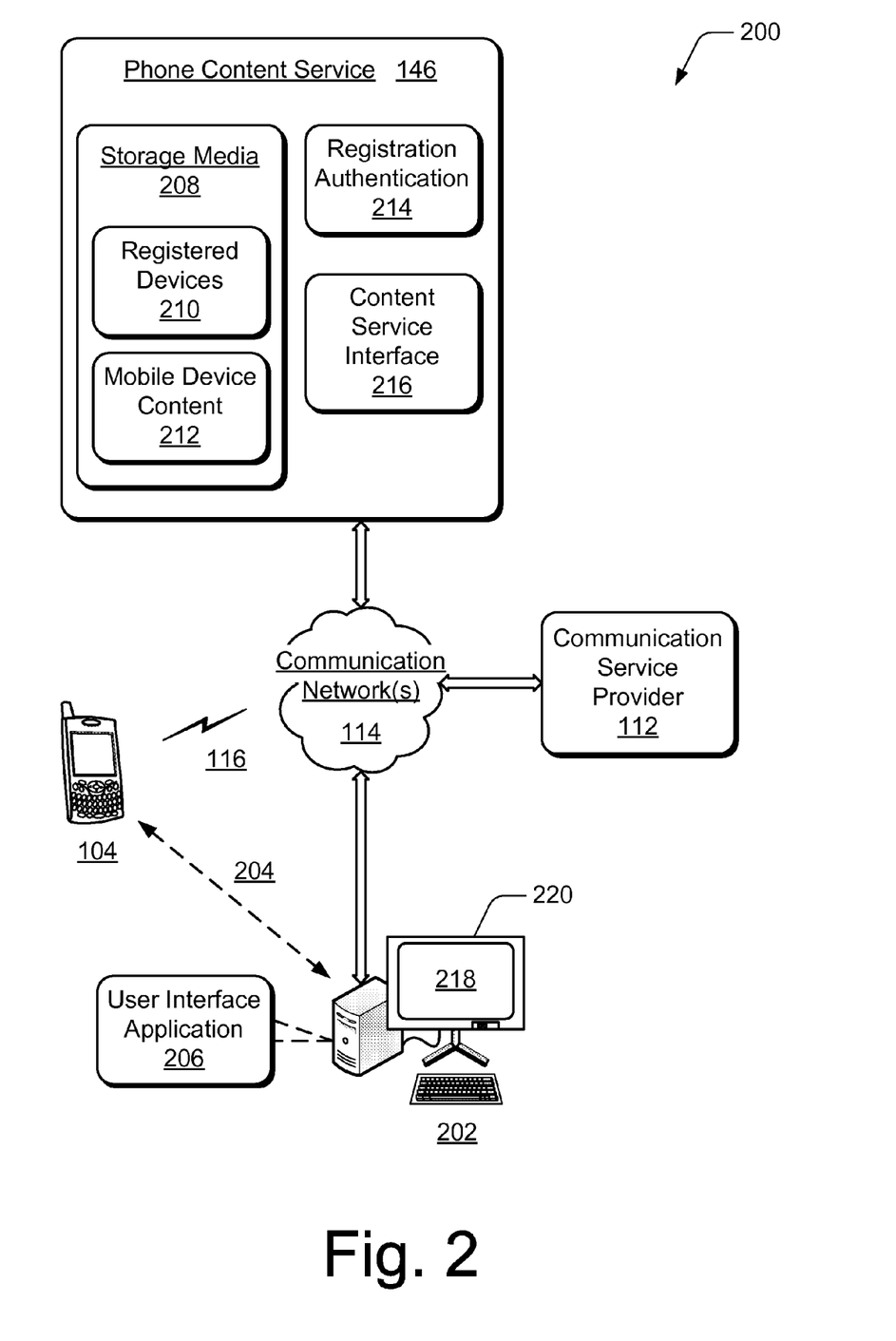
FIG. 2 illustrates another example system in which embodiments of a mobile device dynamic background can be implemented.

FIG. 2 illustrates another example system 200 in which various embodiments of a mobile device dynamic background can be implemented. Example system 200 includes a mobile phone 104, communication service provider 112, and phone content service 146 that are all implemented for communication via the communication network(s) 114 and/or the wireless network 116. The mobile phone 104 is an example of mobile device 102 that is described with reference to FIG. 1, and can be implemented with one or more processors, communication components, memory components, and signal processing and control circuits for data and/or voice communications. Implementations of the communication service provider 112, and the communication network(s) 114 and/or wireless network 116 are also described with reference to FIG. 1.

Example system 200 includes a computer system 202 that may be synched 204 with the mobile phone 104, and can include a user interface application 206 to interface with the phone content service 146 via the communication network(s) 114 and/or wireless network 116. The computer system 202 can include synched content for the mobile phone 104, such as synched images that are communicated to the mobile phone via the communication network(s) 114, the phone content service 146, and the wireless network 116.

The phone content service 146 can be implemented as a subscription-based service, an independent service, and/or a third-party service to implement the various embodiments of a mobile device dynamic background as described herein. Alternatively, the phone content service 146 can be implemented as a component or service of the communication service provider 112, and optionally, be made available as a service or feature of a mobile phone service contract. The phone content service 146 can also be implemented as computer-executable instructions and executed by processor(s) to implement the various embodiments and/or features described herein. In addition, the phone content service 146 can be implemented with any number and combination of differing components as further described with reference to the example service shown in FIG. 4.

In this example, phone content service 146 includes storage media 208 to store or otherwise maintain various data and media content, such as a database of registered devices 210 and mobile device content 212. The database of registered devices 210 can include an identifier of the mobile phone 104 that is registered with the phone content service 146 and/or registered via the communication service provider 112.

The mobile device content 212 that is maintained by the storage media 208 can include synched content for the mobile phone 104, such as synched images that are communicated to the mobile phone as background images, and can include any other data that is associated with a mobile device. For example, the mobile device content 212 can include any type of data and audio, video, or image content, such as configuration settings of the mobile phone 104, media content stored on the mobile phone, information associated with a user of the mobile phone, business or personal information, documents, and/or messaging content that has been received and/or communicated via the mobile phone 104.

The phone content service 146 can also include a feature for registration authentication 214 to verify a particular mobile device for synchronized content updates. For example, a unique identifier can be established for a particular user that is associated with the mobile phone 104 and/or the computer system 202. The unique identifier can include any one or combination of a user identifier, a computer identifier, a phone identifier, a phone number, and any other identifier that can be utilized for registration authentication 214.

The phone content service 146 can also include a content service interface 216 that can be accessed via the computer system 202 or any other wired or wireless desktop or laptop computer, or similar computing device that is networked to access the phone content service. The computer system 202 includes the user interface application 206 to display a phone content service user interface 218 on a display device 220 (e.g., an LCD or similar display device). A user or owner of a mobile device, such as the mobile phone 104, can then access the phone content service 146 via the phone content service user interface 218 at the computer system 202.

Example method 300 is described with reference to FIG. 3 in accordance with one or more embodiments of a mobile device dynamic background. Generally, any of the functions, methods, procedures, components, and modules described herein can be implemented using hardware, software, firmware, fixed logic circuitry, manual processing, or any combination thereof. A software implementation of a function, method, procedure, component, or module represents program code that performs specified tasks when executed on a computing-based processor. Example method 300 may be described in the general context of computer-executable instructions, which can include software, applications, routines, programs, objects, components, data structures, procedures, modules, functions, and the like.

The method(s) may also be practiced in a distributed computing environment where functions are performed by remote processing devices that are linked through a communication network. In a distributed computing environment, computer-executable instructions may be located in both local and remote computer storage media, including memory storage devices. Further, the features described herein are platform-independent such that the techniques may be implemented on a variety of computing platforms having a variety of processors.

Figure 3:
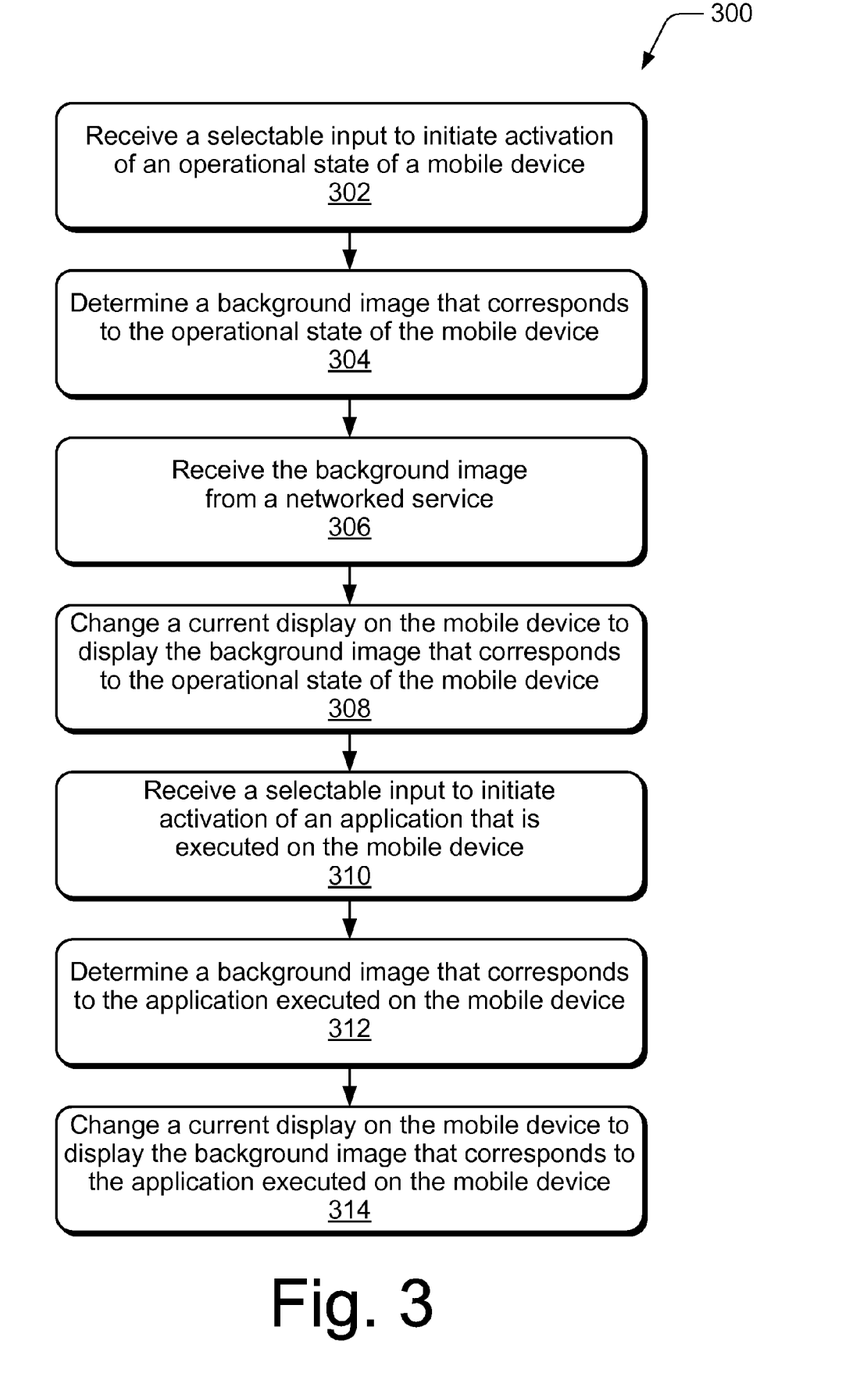
FIG. 3 illustrates example method(s) for a mobile device dynamic background in accordance with one or more embodiments.

FIG. 3 illustrates example method(s) 300 of a mobile device dynamic background. The order in which the method is described is not intended to be construed as a limitation, and any number of the described method blocks can be combined in any order to implement the method, or an alternate method.

At block 302, a selectable input is received to initiate activation of an operational state of a mobile device and, at block 304, a background image is determined that corresponds to the operational state of the mobile device. For example, a selectable input is received when a selectable input control 110 on mobile device 102 (FIG. 1) activates an operational state of the mobile device, such as to turn the mobile device on, unlock functions of the mobile device, activate the display 108 of the mobile device, and/or initiate any other operational state of the device. The display service 134 determines a background image 136, such as a home screen image, that corresponds to the operational state of the mobile device. Similarly, a selectable input is received when a selectable input control 110 on mobile device 102 locks the functions of the mobile device, and the display service 134 determines a background image 136, such as a lock screen image, that corresponds to the operational state of the mobile device.

At block 306, the background image is received from a networked service. For example, the background image is optionally received from the phone content service 146 as a synched image 142 that is maintained on computer system 202 which is synched with the mobile device 102. The synched image 142 is communicated from the computer system 202 to the phone content service 146 (e.g., networked service) that then communicates the synched image 142 to the mobile device. Alternatively, the background image is optionally received from the phone content service 146 as a filtered image 144 that is identified at the phone content service as including an image of a user of the mobile device.

At block 308, a current display on the mobile device is changed to display the background image that corresponds to the operational state of the mobile device. For example, the display service 134 changes the current display on the mobile device 102 to display a home screen image as the background image 136 that corresponds to the operational state of the mobile device when the selectable input is received. Similarly, the display service 134 changes the current display on the mobile device 102 to display a lock screen image as the background image 136 that corresponds to the operational state of the mobile device when the selectable input is received.

At block 310, a selectable input is received to initiate activation of an application that is executed on the mobile device and, at block 312, a background image is determined that corresponds to the application that is executed on the mobile device. For example, a selectable input is received when a selectable input control 110 on mobile device 102 activates a calendar (e.g., a component of the personal information application 128) that is executed by the processor(s) 118 on the mobile device. The display service 134 determines a background image 136, such as a photographic image of a person that is listed as a contact (e.g., from the contacts data 132) that is included in an appointment on the calendar. Similarly, a selectable input is received when a selectable input control 110 on mobile device 102 activates email (e.g., another component of the personal information application 128) that is executed by the processor(s) 118 on the mobile device. The display service 134 determines a background image 136, such as a photographic image of a person that is listed as a contact (e.g., from the contacts data 132) from which an email has been received.

At block 314, the current display on the mobile device is changed to display the background image that corresponds to the application executed on the mobile device when the selectable input is received. For example, the display service 134 changes the current display on the mobile device 102 to display a photographic image of a contact (e.g., from the contacts data 132) that corresponds to the application, such as a photographic image of a contact that is included in an appointment on the calendar, or a photographic image of a contact (e.g., from the contacts data 132) from which an email has been received.

Figure 4:
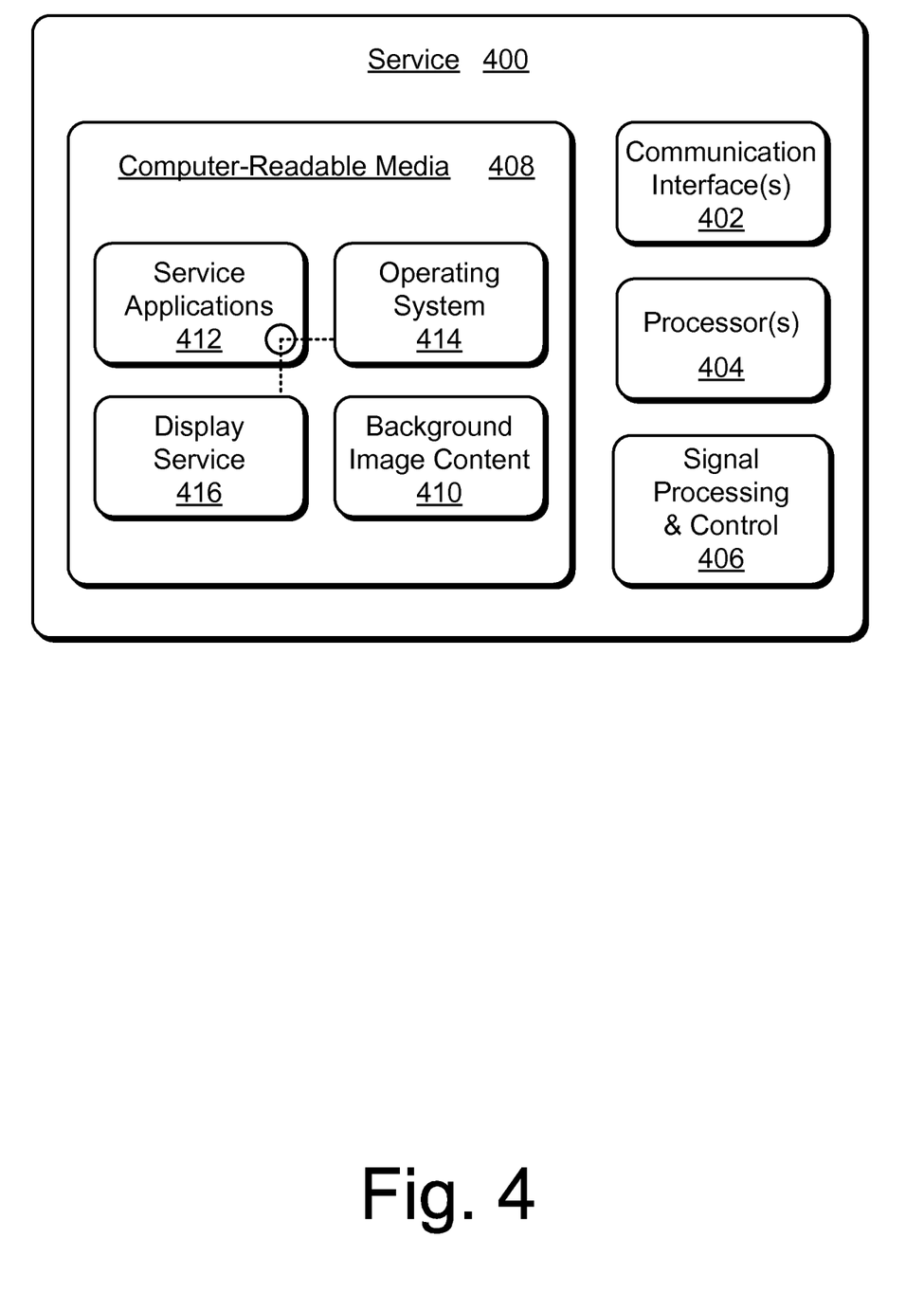
FIG. 4 illustrates various components of an example service that can implement embodiments of a mobile device dynamic background.

FIG. 4 illustrates various components of an example service 400 that can implement various embodiments of a mobile device dynamic background, such as shown in FIG. 1 and/or FIG. 2. Service 400 can include one or more communication interfaces 402 that can be implemented as any one or more of a serial and/or parallel interface, a wireless interface, any type of network interface, a modem, and as any other type of communication interface for data and/or voice communication. The communication interfaces 402 provide a connection and/or communication links between service 400 and communication network(s) by which other communication, electronic, and computing devices can communicate with service 400.

Service 400 can include one or more processors 404 (e.g., any of microprocessors, controllers, and the like) which process various computer-executable instructions to control the operation of service 400 and to implement embodiments of a mobile device dynamic background. Alternatively or in addition, service 400 can be implemented with any one or combination of hardware, firmware, or fixed logic circuitry that is implemented in connection with signal processing and control circuits generally identified at 406.

Service 400 can also include computer-readable media 408, such as one or more memory components, examples of which include random access memory (RAM), non-volatile memory (e.g., any one or more of a read-only memory (ROM), flash memory, EPROM, EEPROM, etc.), and a disk storage device. A disk storage device can include any type of magnetic or optical storage device, such as a hard disk drive, a recordable and/or rewriteable compact disc (CD), any type of a digital versatile disc (DVD), and the like.

Computer-readable media 408 provides data storage mechanisms to store various types of information and/or data related to operational aspects of service 400, such as background image content 410, and provides storage for various service applications 412. For example, an operating system 414 can be maintained as a computer application with the computer-readable media 408 and executed on the processors 404. The service applications 412 can also include a display service 416. In this example, the service applications 412 are shown as software modules and/or computer applications that can implement various embodiments of a mobile device dynamic background.

Although not shown, service 400 can include a system bus or data transfer system that couples the various components within the service. A system bus can include any one or combination of different bus structures, such as a memory bus or memory controller, a peripheral bus, a universal serial bus, and/or a processor or local bus that utilizes any of a variety of bus architectures.

Figure 5:
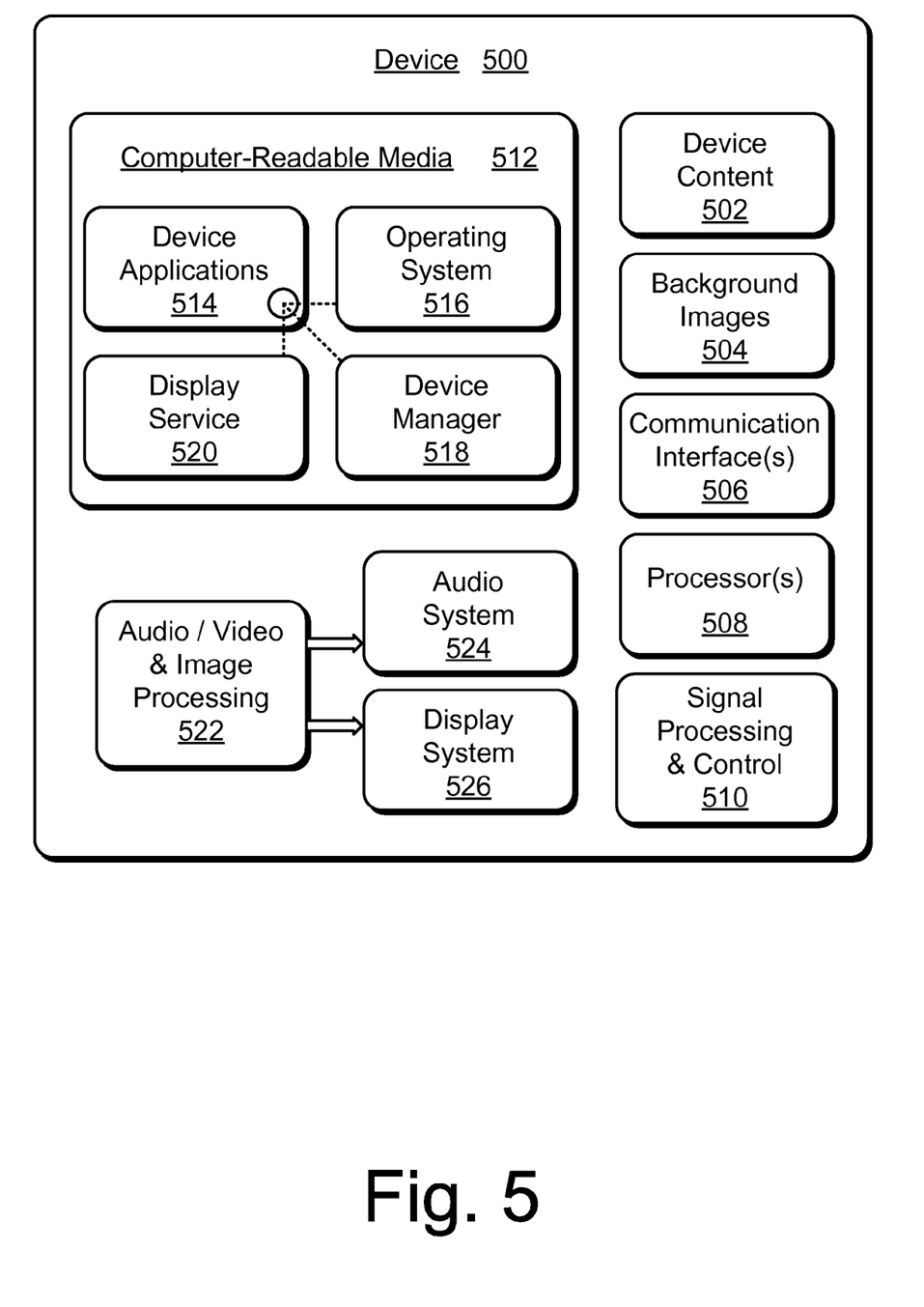
FIG. 5 illustrates various components of an example device that can implement embodiments of a mobile device dynamic background.

FIG. 5 illustrates various components of an example device 500 that can be implemented as any form of a mobile communication, computing, electronic, and/or media device to implement various embodiments of a mobile device dynamic background. For example, device 500 can be implemented as a mobile phone or media device as shown in FIG. 1 and/or FIG. 2. In various embodiments, device 500 can be implemented as any one or combination of a wireless or mobile phone, a portable computer device, and/or as any other type of mobile device that may be implemented for data and/or voice communications.

Device 500 can include device content 502, such as configuration settings of the device, media content stored on the device, information associated with a user of the device (e.g., user profile data), business or personal information, documents, and/or messaging content that has been received and/or communicated via the device. Media content stored on the device 500 can include any type of data and audio, video, and/or image media content. Device 500 further includes one or more communication interfaces 506 that can be implemented for any type of data and/or voice communications.

Device 500 can include one or more processors 508 (e.g., any of microprocessors, controllers, and the like) which process various computer-executable instructions to control the operation of device 500 and to implement embodiments of a mobile device dynamic background. Alternatively or in addition, device 500 can be implemented with any one or combination of hardware, firmware, or fixed logic circuitry that is implemented in connection with signal processing and control circuits which are generally identified at 510.

Device 500 can also include computer-readable media 512, such as one or more memory components, examples of which include random access memory (RAM), non-volatile memory (e.g., any one or more of a read-only memory (ROM), flash memory, EPROM, EEPROM, etc.), and a disk storage device. A disk storage device can include any type of magnetic or optical storage device, such as a hard disk drive, a recordable and/or rewriteable compact disc (CD), any type of a digital versatile disc (DVD), and the like.

Computer-readable media 512 provides data storage mechanisms to store the device content 502 and the background images 504, as well as various device applications 514 and any other types of information and/or data related to operational aspects of device 500. For example, an operating system 516 can be maintained as a computer application with the computer-readable media 512 and executed on the processors 508. The device applications 514 can also include a device manager 518 and a display service 520. In this example, the device applications 514 are shown as software modules and/or computer applications that can implement various embodiments of a mobile device dynamic background.

Device 500 can also include an audio, video, and/or image processing system 522 that provides audio data to an audio rendering system 524 and/or provides video or image data to a display system 526. The audio rendering system 524 and/or the display system 526 can include any devices or components that process, display, and/or otherwise render audio, video, and image data. The audio rendering system 524 and/or the display system 526 can be implemented as integrated components of the example device 500.

Although embodiments of a mobile device dynamic background have been described in language specific to features and/or methods, it is to be understood that the subject of the appended claims is not necessarily limited to the specific features or methods described. Rather, the specific features and methods are disclosed as example implementations of a mobile device dynamic background.

The invention claimed is:

1. A method, comprising:
receiving a selectable input to initiate activation of an operational state of a mobile device and unlock one or more functions of the mobile device;
determining a background image associated with a user of the mobile device and that corresponds to the operational state of the mobile device, the background image determined from a plurality of images that includes at least one image associated with the user of the mobile device based on a tag that corresponds to the user at a social networking site, the at least one image communicated to the mobile device from a phone content service that provides media content from the social networking site to the mobile device; and
changing a current display on the mobile device to display the background image that is associated with the user of the mobile device and corresponds to the operational state when the selectable input is received.

2. A method as recited in claim 1, wherein the selectable input is received to turn the mobile device on and activate a display screen of the mobile device, and wherein the background image is displayed as a home screen image.

3. A method as recited in claim 1, further comprising receiving an additional selectable input to lock one or more of the functions of the mobile device, and wherein the background image is displayed as a lock screen image.

4. A method as recited in claim 1, wherein the background image is a synched image that is maintained on a computer system that is synched with the mobile device, and wherein the synched image is communicated from the computer system to a networked service that then communicates the synched image to the mobile device.

5. A method as recited in claim 1, wherein the plurality of images includes a filtered image that is identified as including an image of a user of the mobile device, and wherein the filtered image is communicated from a networked service to the mobile device.

6. A method as recited in claim 1, further comprising:
receiving an additional selectable input to initiate activation of an application that is executed on the mobile device;
determining a different background image that corresponds to the application that is executed on the mobile device; and
changing the background image displayed on the mobile device to display the different background image that corresponds to the application when the additional selectable input is received.

7. A method as recited in claim 6, wherein the additional selectable input is received to initiate a calendar, and wherein the different background image is displayed as a photographic image of a contact that is included in an appointment on the calendar.

8. A method as recited in claim 6, wherein the additional selectable input is received to initiate email, and wherein the different background image is displayed as a photographic image of a contact from which an email has been received.

9. A mobile device, comprising:
selectable controls configured for a selectable input to initiate activation of an operational state of the mobile device;
a display service configured to:
determine a background image that corresponds to the operational state of the mobile device, the background image determinable from multiple background images that are associated with a user of the mobile device, at least one of the multiple background images including an image associated with the user of the mobile device based on an image tag that corresponds to the user at a social networking site, the image communicated to the mobile device from a networked service that provides media content from the social networking site responsive to a determination that the image is associated with the user of the mobile device; and
initiate a change of a current display on the mobile device to display the background image that is associated with the user of the mobile device and corresponds to the operational state when the selectable input is received.

10. A mobile device as recited in claim 9, wherein the display service is further configured to receive the selectable input to at least one of turn the mobile device on, unlock functions of the mobile device, or activate a display screen of the mobile device, and wherein the background image is displayed as a home screen image.

11. A mobile device as recited in claim 9, wherein the display service is further configured to receive the selectable input to lock functions of the mobile device, and wherein the background image is displayed as a lock screen image.

12. A mobile device as recited in claim 9, further comprising an interface configured to receive at least one of the multiple background images as a synched image from the networked service, the synched image being maintained on a computer system that is synched with the mobile device, and wherein the synched image is communicated from the computer system to the networked service.

13. A mobile device as recited in claim 9, further comprising an interface configured to receive the background image as a filtered image from the networked service, the filtered image being identified as including the image of the user of the mobile device.

14. A mobile device as recited in claim 9, wherein:
the selectable controls are further configured for an additional selectable input to initiate activation of an application that is executed on the mobile device;
the display service is further configured to:
determine a different background image that corresponds to the application that is executed on the mobile device; and
initiate a change from the background image displayed on the mobile device to display the different background image that corresponds to the application when the additional selectable input is received.

15. A mobile device as recited in claim 14, wherein the additional selectable input is received to initiate a calendar, and wherein the different background image is displayed as a photographic image of a contact that is included in an appointment on the calendar.

16. A mobile device as recited in claim 14, wherein the additional selectable input is received to initiate email, and wherein the different background image is displayed as a photographic image of a contact from which an email has been received.

17. One or more computer-readable storage media devices storing computer-executable instructions that, when executed, initiate a display service to:
determine a background image associated with a user of a mobile device and that corresponds to an operational state of the mobile device when a selectable input is received to turn on the mobile device and initiate activation of the operational state, the background image determinable from a plurality of images associated with the user of the mobile device, the plurality of images including at least one image from a social networking site communicated to the mobile device and associated with the user based on an image tag that corresponds to the user at the social networking site; and
change a current display on the mobile device to display the background image that is associated with the user of the mobile device and corresponds to the operational state when the selectable input is received.

18. One or more computer-readable storage media devices as recited in claim 17, further storing computer-executable instructions that, when executed, initiate the display service to determine that the background image is a lock screen image when the selectable input is received to lock functions of the mobile device.

19. One or more computer-readable storage media devices as recited in claim 17, further storing computer-executable instructions that, when executed, initiate the display service to:
determine a different background image that corresponds to an application that is executed on the mobile device when an additional selectable input is received to initiate activation of the application; and
change the background image displayed on the mobile device to display the different background image that corresponds to the application when the additional selectable input is received.

20. One or more computer-readable storage media devices as recited in claim 17, further storing computer-executable instructions that, when executed, initiate the display service to determine that the background image is maintained on at least one of the mobile device or at a phone content service from which the background image is received.

* * * * *